United States Patent
Ohguchi et al.

(10) Patent No.: US 7,599,263 B2
(45) Date of Patent: Oct. 6, 2009

(54) REPRODUCING APPARATUS, REPRODUCING METHOD, AND REPRODUCING PROGRAM

(75) Inventors: Nobuhiko Ohguchi, Tokyo (JP); Atsushi Ishihara, Tokyo (JP)

(73) Assignee: Sony Corporation, Tokyo (JP)

( * ) Notice: Subject to any disclaimer, the term of this patent is extended or adjusted under 35 U.S.C. 154(b) by 539 days.

(21) Appl. No.: 11/509,727

(22) Filed: Aug. 25, 2006

(65) Prior Publication Data

US 2007/0047397 A1 Mar. 1, 2007

(30) Foreign Application Priority Data

Aug. 31, 2005 (JP) .............................. 2005-252692

(51) Int. Cl.
*G11B 5/09* (2006.01)

(52) U.S. Cl. ................ 369/47.3; 369/47.36; 369/53.44; 369/59.14

(58) Field of Classification Search ....................... None
See application file for complete search history.

(56) References Cited

U.S. PATENT DOCUMENTS 6,377,530 B1 * 4/2002 Burrows ................... 369/59.21
6,721,490 B1 * 4/2004 Yao et al. ...................... 386/69

FOREIGN PATENT DOCUMENTS

| JP | 07-14436 | 2/1995 |
|---|---|---|
| JP | 10-074056 | 3/1998 |
| JP | 2002-045580 | 2/2002 |
| JP | 2003-85888 | 3/2003 |
| WO | WO 02/48917 | 6/2002 |

OTHER PUBLICATIONS

U.S. Appl. No. 11/496,916, filed Aug. 1, 2006.
U.S. Appl. No. 11/494,233, filed Jul. 27, 2006.
U.S. Appl. No. 11/429,878, filed May 8, 2006.
U.S. Appl. No. 11/512,324, filed Aug. 30, 2006, Ohguchi, et al.

* cited by examiner

*Primary Examiner*—Muhammad N. Edun
(74) *Attorney, Agent, or Firm*—Oblon, Spivak, McClelland, Maier & Neustadt, L.L.P.

(57) ABSTRACT

A reproducing apparatus includes a storage unit having a plurality of content data stored therein, a reproducing unit reading out the content data stored in the storage unit and reproducing the read content data, and a driving unit driving a predetermined driven unit according to the content of the content data reproduced in the reproducing step. The reproducing unit has two reproduction modes, that is, a normal reproduction mode in which the content data stored in the storage unit are reproduced in a predetermined order and a recommend mode in which some of the content data stored in the storage unit are selected as recommended music files and the selected content data are reproduced. When the reproducing unit operates in the recommend mode, the driving unit drives the driven unit more quickly than in the normal reproduction mode.

4 Claims, 11 Drawing Sheets

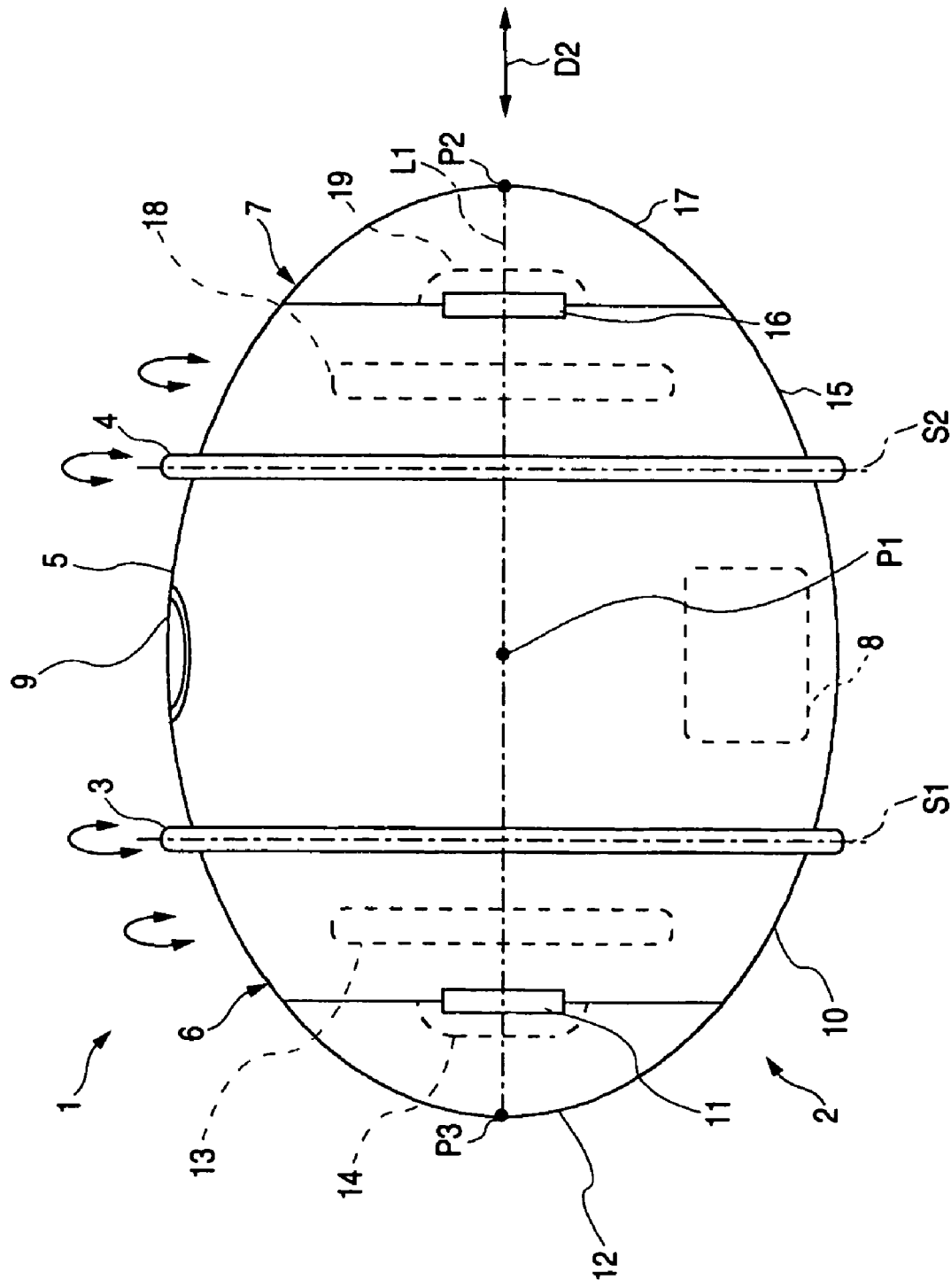

REPRODUCING APPARATUS, REPRODUCING METHOD, AND REPRODUCING PROGRAM

CROSS REFERENCES TO RELATED APPLICATIONS

The present invention contains subject matter related to Japanese Patent Application JP 2005-252692 filed in the Japanese Patent Office on Aug. 31, 2005, the entire contents of which being incorporated herein by reference.

BACKGROUND OF THE INVENTION

1. Field of the Invention

The present invention relates to a reproducing apparatus, a reproducing method, and a reproducing program, and more specifically, to a music reproducing apparatus for reproducing music on the basis of music data.

2. Description of the Related Art

In recent years, portable music reproducing apparatuses for reproducing music data stored in, for example, a non-volatile memory or a hard disk drive, have come into widespread use (for example, see JP-A-2003-85888).

In general, this type of music reproducing apparatus has three music data reproducing modes, that is, a normal reproduction mode in which music files stored in a storage medium are sequentially reproduced, a random reproduction mode in which the music files are randomly reproduced, and a so-called recommend mode in which user's favorite music files among the music files stored in the storage medium are selectively reproduced as recommended music files on the basis of user's preference or the frequency of reproduction.

SUMMARY OF THE INVENTION

However, in the music reproducing apparatus according to the related art, the current reproduction mode is just displayed on a display unit using character information, and it is difficult to intuitively notify a user of the current reproduction mode.

Accordingly, it is desirable to provide a reproducing apparatus, a reproducing method, and a reproducing program capable of intuitively notifying a user of a reproduction mode.

According to an embodiment of the invention, a reproducing apparatus includes: a storage unit having a plurality of content data stored therein; a reproducing unit reading out the content data stored in the storage unit and reproducing the read content; a driving unit driving a predetermined driven unit according to the content of the content data reproduced by the reproducing unit; and a control unit controlling the reproducing unit in a normal reproduction mode in which the content data stored in the storage unit are reproduced in a predetermined order and a recommend mode in which some of the content data stored in the storage unit are selected as recommended music files and the selected content data are reproduced, and controlling the driving unit in the recommend mode to drive the driven unit more quickly than in the normal reproduction mode.

According to this structure, the reproducing apparatus can intuitively notify a user of the current reproduction mode through the operational state of the driven unit.

According to the above-described embodiment of the invention, a reproducing apparatus includes: a storage unit having a plurality of content data stored therein; a reproducing unit reading out the content data stored in the storage unit and reproducing the read content; a driving unit driving a predetermined driven unit according to the content of the content data reproduced by the reproducing unit; and a control unit controlling the reproducing unit in a normal reproduction mode in which the content data stored in the storage unit are reproduced in a predetermined order and in a recommend mode in which some of the content data stored in the storage unit are selected as recommended music files and the selected content data are reproduced, and controlling the driving unit in the recommend mode to drive the driven unit more quickly than in the normal reproduction mode. According to this structure, the reproducing apparatus can intuitively notify a user of the current reproduction mode through the operational state of the driven unit.

BRIEF DESCRIPTION OF THE DRAWINGS

FIG. 2 is a diagram schematically illustrating the front structure of the music reproducing robot according to the embodiment;

DESCRIPTION OF THE PREFERRED EMBODIMENTS

Hereinafter, an embodiment of the invention will be described in detail with reference to the accompanying drawings.

(1) Configuration of Music Reproducing Robot

Figure 1A:
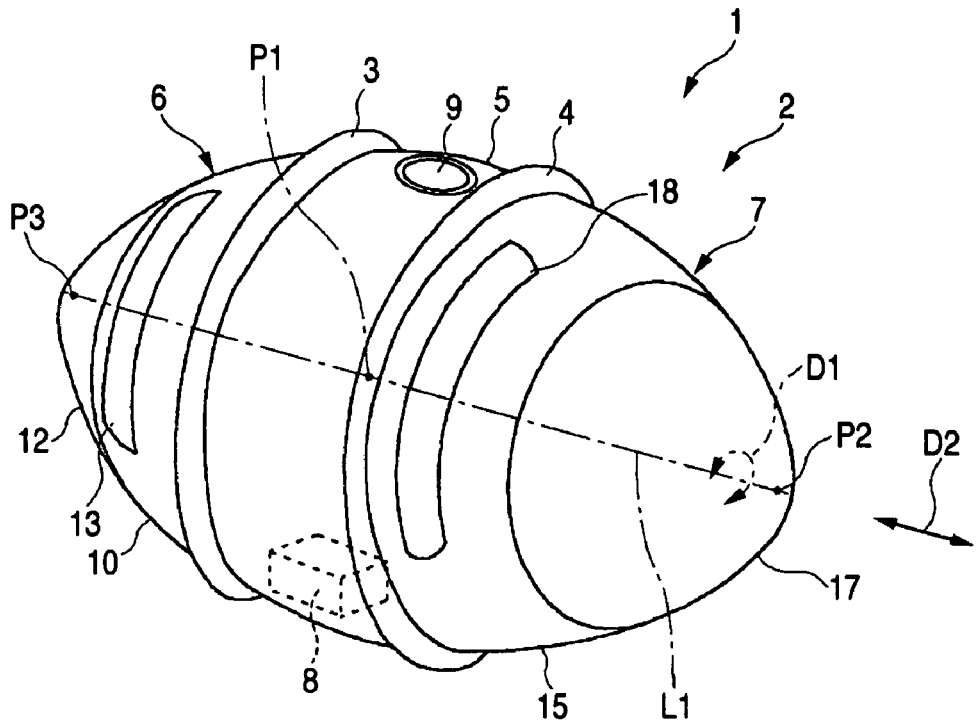
FIGS. 1A and 1B are diagrams schematically illustrating the exterior structure of a music reproducing robot according to an embodiment of the invention.
Figure 1B:
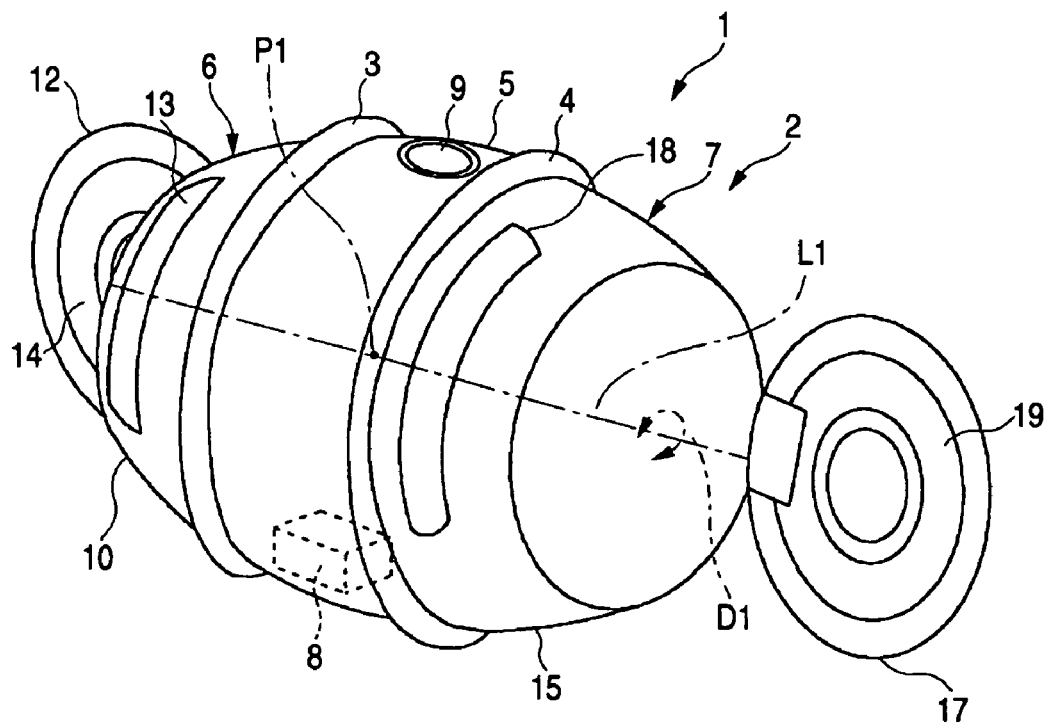

In FIGS. 1A and 1B, reference numeral 1 denotes a music reproducing robot as a whole, and the music reproducing robot 1 includes an ellipsoidal case 2 having a spheroidal shape.

As shown in FIG. 2, the music reproducing robot 1 has a left wheel 3 and a right wheel 4. The left and right wheels 3 and 4 protrude from the ellipsoidal case 2 so as to make a round of the outer circumference of the ellipsoidal case 2, on a left vertical surface S1 and a right vertical surface S2 that are equidistant from a central point P1 of a horizontal rotation axis line L 1 linking end potions P2 and P3 of a major axis of the ellipsoidal case 2 so as to be orthogonal to the horizontal rotation axis line L1, so the left and right wheels 3 and 4 are formed in ring shapes. The left wheel 3 and the right wheel 4 are configured to be rotatable in an axis rotation direction D1 of the horizontal rotation axis line L1.

The ellipsoidal case 2 is composed of a central case 5 provided between the left wheel 3 and the right wheel 4, a left case 6 that is provided on the left side of the central case 5 and is tapered toward the left end portion P3 from the central case 5, and a right case 7 that is provided on the right side of the central case 5 and is tapered toward the right end portion P2 from the central case 5.

Figure 3:
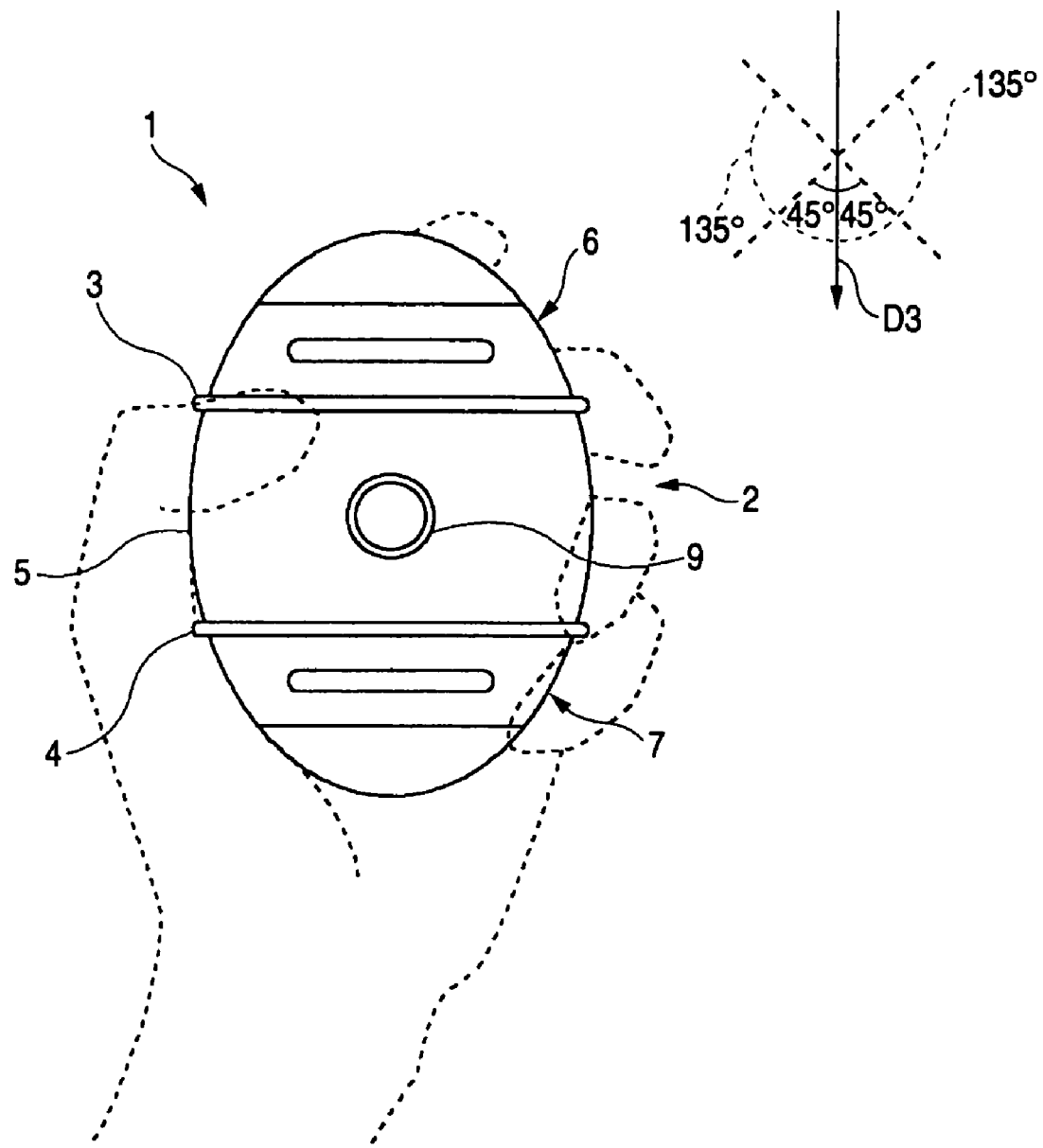
FIG. 3 is a diagram schematically illustrating the upper structure of the music reproducing robot according to the embodiment.

The central case 5 has a weight 8 for stabilizing the posture of the central case 5 (that is, for preventing the central case 5 from rotating in the axis rotation direction D1 of the horizontal rotation axis line L1) therein on the lower side thereof. As shown in FIG. 3, a contact detecting sensor 9 for detecting the contact of a user's finger or hand is provided on the surface of the central case 5.

The left case 6 includes a left rotator 10 that is configured to be rotatable with respect to the central case 5 in the axis rotation direction D1 of the horizontal rotation axis line L1 and a left opening/closing member 12 that is provided on the left side of the left rotator 10 through a hinge 11 so that it is openable and closable outside toward the left side. A light emitting portion 13 having a light emitting unit, such as an LED (light emitting diode), therein is provided on the surface of the left rotator 10. The left opening/closing member 12 has a speaker 14 therein. When the left opening/closing member 12 is opened toward the left side through the hinge 11, the speaker 14 of the left opening/closing member 12 is exposed to the outside, as shown in FIG. 1B.

Similarly, the right case 7 includes a right rotator 15 that is configured to be rotatable with respect to the central case 5 in the axis rotation direction D1 of the horizontal rotation axis line L1 and a right opening/closing member 17 that is provided on the right side of the right rotator 15 through a hinge 16 so that it is openable and closable outside toward the right side. A light emitting portion 18 is provided on the surface of the right rotator 15. The right opening/closing member 17 has a speaker 19 therein. When the right opening/closing member 17 is opened toward the right side through the hinge 16, the speaker 19 of the right opening/closing member 17 is exposed to the outside, as shown in FIG. 1B.

Figure 4:
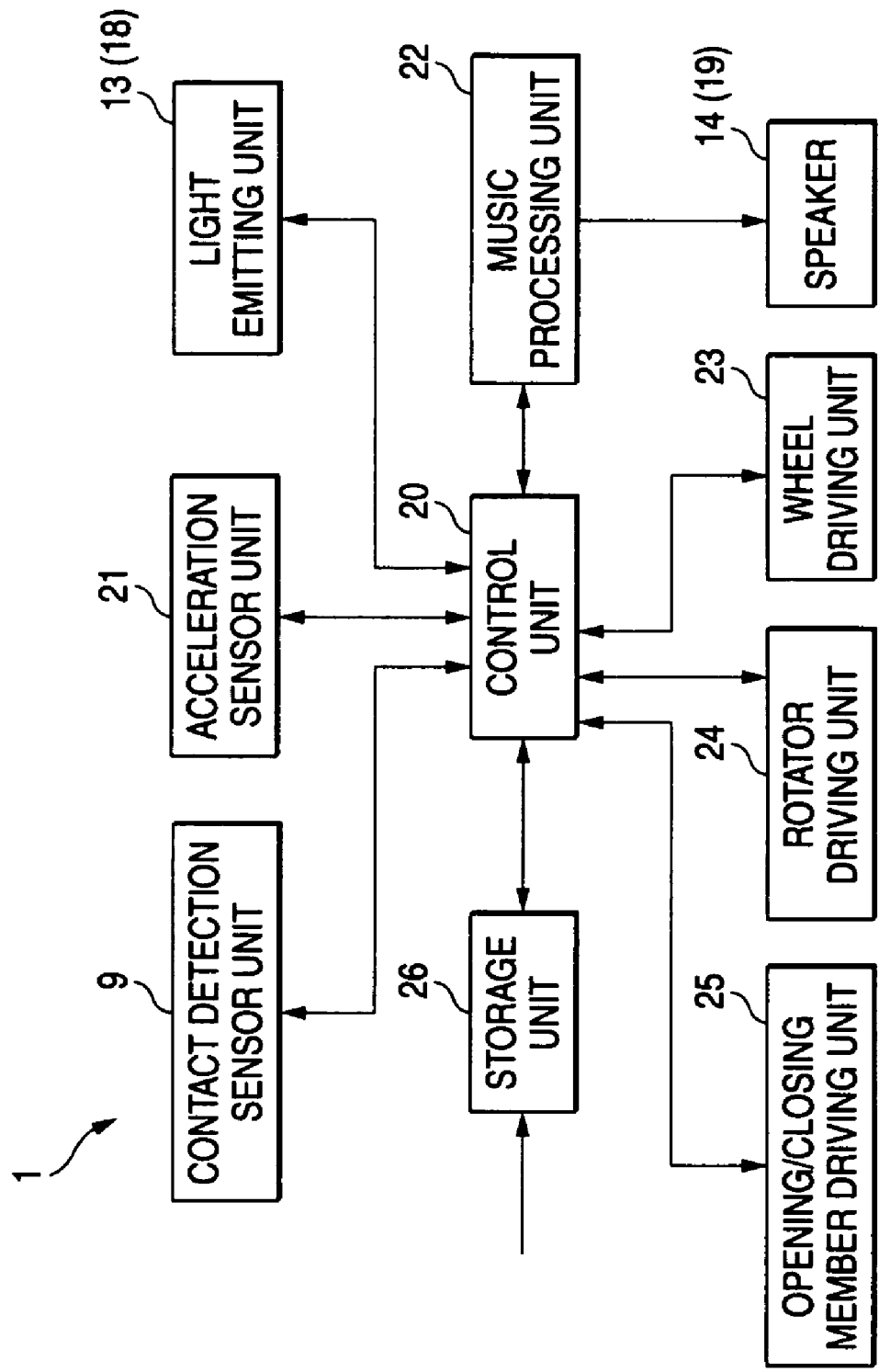
FIG. 4 is a block diagram schematically illustrating the circuit structure of the music reproducing robot according to the embodiment.

Next, the circuit configuration of the music reproducing robot 1 will be described below with reference to FIG. 4. In the music reproducing robot 1, each component is connected to a control unit 20 for generally controlling the whole apparatus. In the control unit 20, a RAM (random access memory), a ROM (read only memory), and a clock circuit are connected to a CPU (central processing unit). The CPU reads out various control programs stored in the ROM and executes the programs on the RAM to control various operations of the music reproducing robot 1.

After the control unit 20 detects that the music reproducing robot 1 is lifted up from, for example, the floor through an acceleration sensor unit 21, the acceleration sensor unit 21 detects that a user's finger or hand comes into contact with a contact detection sensor unit 9 provided on the surface of the central case 5, and that the ellipsoidal case 2 oscillates with an increasing speed higher than a predetermined value. Then, the control unit 20 performs an oscillation direction determining process for determining the oscillation direction of the ellipsoidal case 2.

For example, when the acceleration sensor unit 21 confirms that the reproduction of music is instructed in the oscillation direction of the case in the oscillation direction determining process, the control unit 20 determines whether a reproduction control instruction for reproducing music is input.

Then, the control unit 20 reads out music data stored in a storage unit 26 and sequentially outputs music through a music processing unit 22 and the speakers 14 and 19 on the basis of the read music data (music reproduction). In this way, the music reproducing robot 1 can perform a music reproducing process of outputting music through the speakers 14 and 19 on the basis of the music data stored in the storage unit 26.

Subsequently, when both the left wheel 3 and the right wheel 4 come into contact with the floor and the acceleration sensor unit 21 detects that the ellipsoidal case 2 is positioned on the floor, the control unit 20 performs a process of operating each unit of the ellipsoidal case 2 according to the tune (for example, tempo or interval) of the music being reproduced (a reproduced-tune-based operation process).

That is, in the reproduced-tune-based operation process, the control unit 20 controls a wheel driving unit 23 according to the tune of the music being reproduced to rotatably drive the left and right wheels 3 and 4 having a ring shape and the same shape in the axis rotation direction D1 of the horizontal rotation axis line L1. In this way, the music reproducing robot 1 can stably move, for example, on the floor in synchronization with the tune of the music being output from the speakers 14 and 19.

Further, in the reproduced-tune-based operation process, the control unit 20 controls a rotator driving unit 24 according to the tune of the music being reproduced to rotatably drive the left rotator 10 and the right rotator 15, thereby rotating, in the axis rotation direction D1 of the horizontal rotation axis line L1, the left case 6 that is configured to be tapered toward the left end from the central case 5 along the horizontal rotation axis line L1 and the right case 7 that is configured to be tapered toward the right end from the central case 5 along the horizontal rotation axis line L1. In this way, the music reproducing robot 1 can rotate the left case 6 and the right case 7 in synchronization with the tune of the music being output from the speakers 14 and 19, without interrupting the movement of the left wheel 3 and the right wheel 4.

Furthermore, in the reproduced-tune-based operation process, the control unit 20 controls an opening/closing member driving unit 25 according to the tune of the music being reproduced to open/close the left opening/closing member 12 and the right opening/closing member 17 to the left and right sides, respectively. In this way, the music reproducing robot 1 can open/close the left opening/closing member 12 and the right opening/closing member 17 in synchronization with the tune of the music being output from the speakers 14 and 19.

Further, in the reproduced-tune-based operation process, the control unit 20 controls the light emitting units 13 and 18 to emit light according to the tune of the music being reproduced. In this way, the music reproducing robot 1 can emit light in synchronization with the tune of the music being output from the speakers 14 and 19.

Furthermore, the music reproducing robot 1 can move, for example like dancing, on the floor according to the tune of the music being reproduced, which makes it possible to further improve entertainment features.

Figure 5:
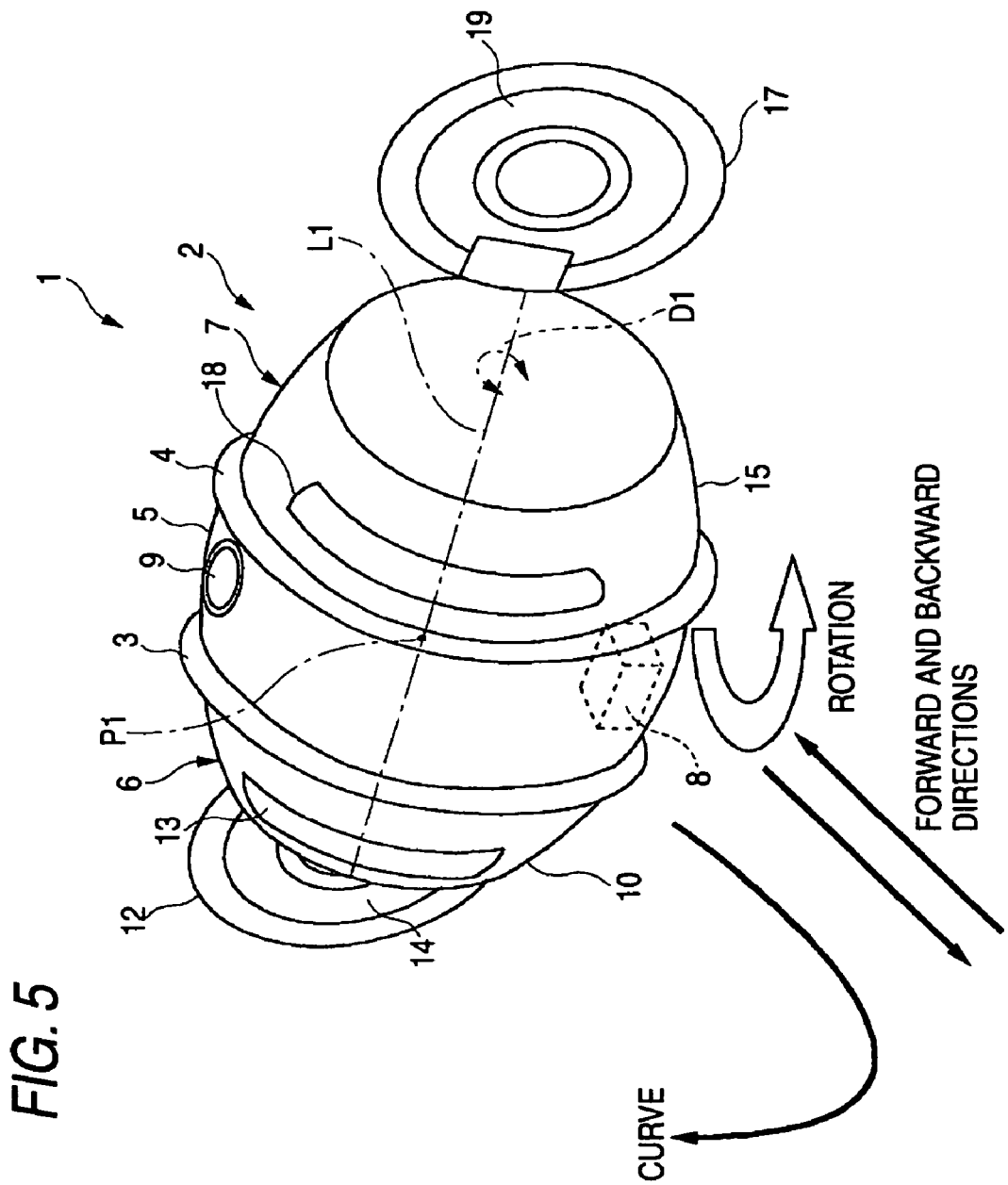
FIG. 5 is a diagram schematically illustrating the movement of the music reproducing robot according to the embodiment.

In this embodiment, as shown in FIG. 5, the music reproducing robot 1 can rotate on the spot, travel like a curve, or move straight in the forward or backward direction, according to the tune of the music being reproduced (the reproduced tune).

For example, when the music reproducing robot 1 rotates on the spot, the control unit 20 controls the wheel driving unit 23 to rotate the left wheel 3 and the right wheel 4 in the opposite direction with the same force. When the music reproducing robot 1 travels like a curve, the control unit 20 controls the wheel driving unit 23 to rotatably drive the left wheel 3 and the right wheel 4 in the same direction with different forces. When the music reproducing robot 1 moves straight in the forward or backward direction, the control unit 20 controls the wheel driving unit 23 to rotatably drive the left wheel 3 and the right wheel 4 in the same direction with the same force.

Therefore, the music reproducing robot 1 according to the embodiment of the invention can reproduce music with improved entertainment features by performing various operations of rotating the left wheel 3 and the right wheel 4 according to the tune of the music reproduced to move the music reproducing robot 1 in all directions, of opening/closing the left opening/closing member 12 and the right opening/closing member 17, and of making the light emitting units 13 and 18 emit light (these operations are generally referred to as motions).

(2) Reproduced-tune-based Operation Process

Figure 6:
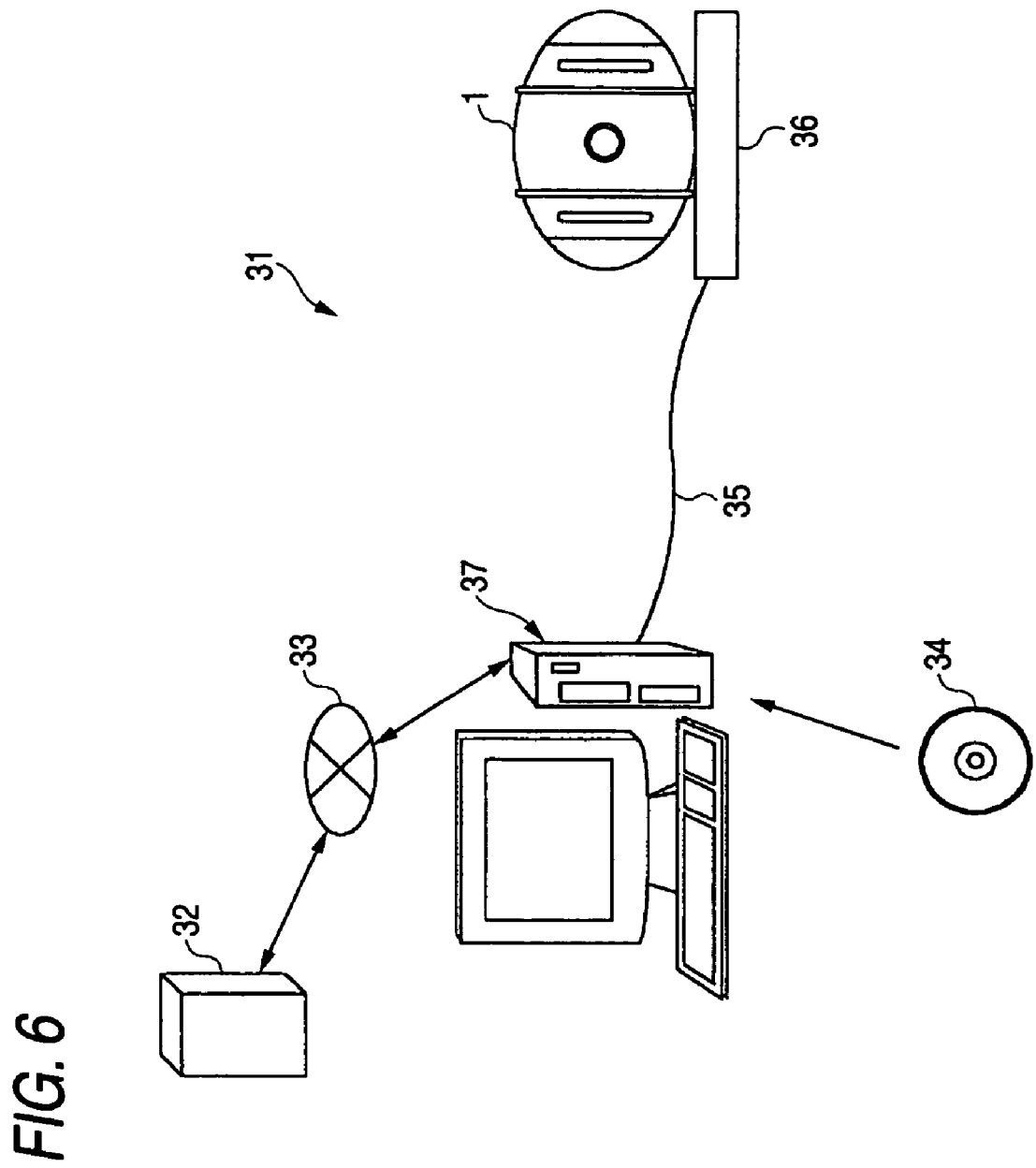
FIG. 6 is a diagram schematically illustrating the structure of a music data transmitting system.

In FIG. 6, a music data transmitting system 31 includes a transmission apparatus 37 that transmits music data acquired from a music data providing sever 32 for providing music data over a network 33 or music data acquired from a storage medium (for example, a compact disk (CD)) 34 having the music data stored therein to the music reproducing robot 1 through a USB (universal serial bus) cable 35 and a cradle 36 on which the music reproducing robot 1 is mounted. In this embodiment, the transmission apparatus 37 corresponds to, for example, a personal computer.

Figure 7:
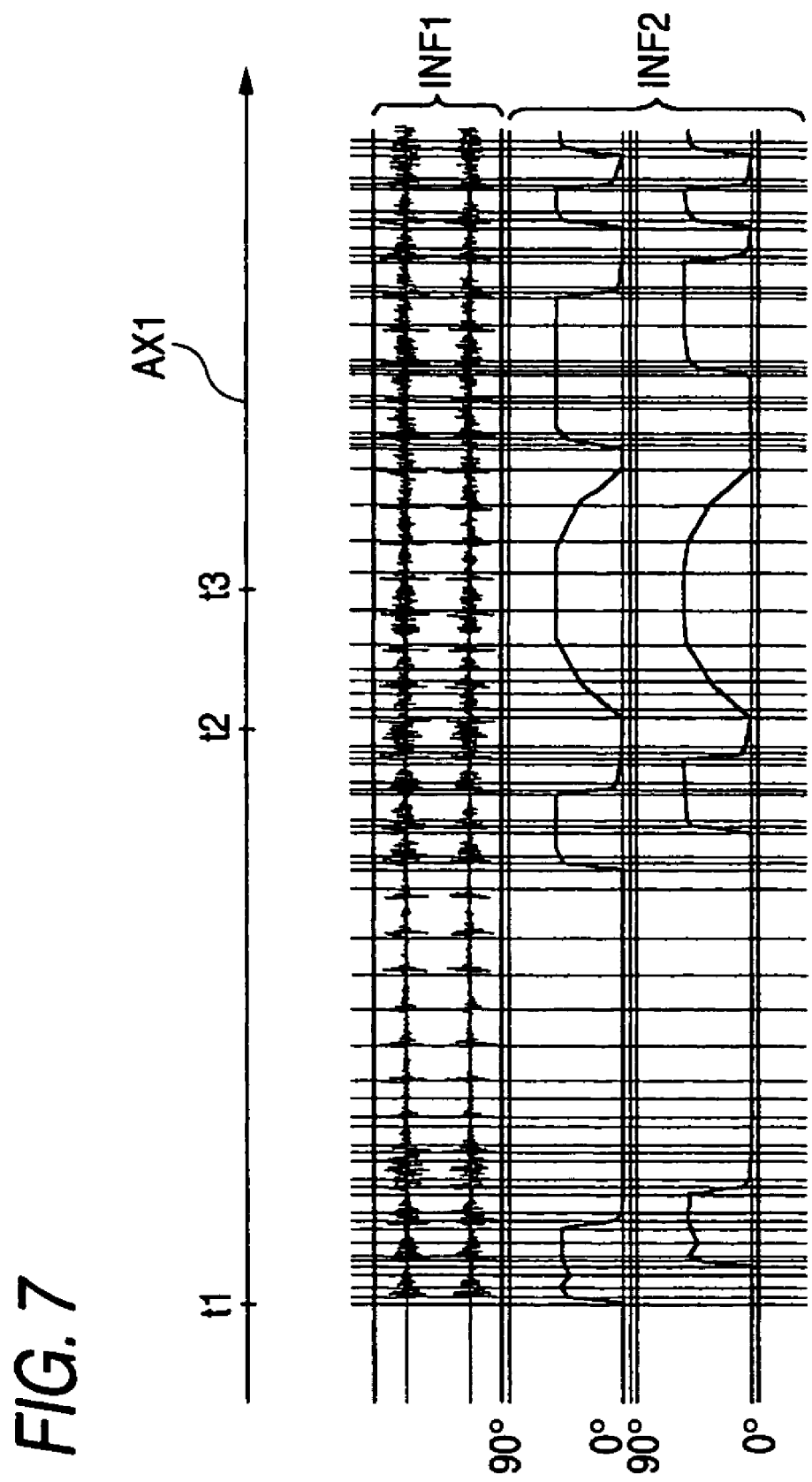
FIG. 7 is a diagram schematically illustrating music analysis result information and driving unit operation information.

The transmission apparatus 37 performs, for example, a frequency analyzing process on the music data before transmitting the music data to the music reproducing robot 1. In this way, as shown in FIG. 7, the transmission apparatus 37 can obtain music analysis result information INF1 in which the result obtained by analyzing the frequency of the music data is represented along a reproduction time axis AX1.

Then, the transmission apparatus 37 creates, on the basis of the obtained music analysis result information INF1, driving unit operation information INF2 in which, for example, the rotational directions of the left wheel 3 and the right wheel 4, the rotational speeds thereof, the rotational directions of the left rotator 10 and the right rotator 15, the rotational angles thereof, the opening/closing angles of the left opening/closing member 12 and the right opening/closing member 17, and the emitting timings of the light emitting units 13 and 18 are represented along the reproduction time axis AX1. In this way, the transmission apparatus 37 can obtain the driving unit operation information INF2 for operating the driving units 3, 4, 12, 17, 10, and 15 according to the tune of the music data. Further, the opening/closing angles of the left opening/closing member 12 and the right opening/closing member 17 are represented along the reproduction time axis AX1 of the music data in the driving unit operation information INF2 shown in FIG. 7.

For example, when a user performs the transmission process, the transmission apparatus 37 transmits music data and the driving unit operation information INF2 corresponding to the music data to the music reproducing robot 1 through the USB cable 35 and the cradle 36. Then, the control unit 20 of the music reproducing robot 1 stores the music data and the driving unit operation information INF2 transmitted from the transmission apparatus 37 in the storage unit 26.

As a result, when reproducing the music data stored in the storage unit 26, the control unit 20 of the music reproducing robot 1 can perform the reproduced-tune-based operation process for operating the driving units 3, 4, 12, 17, 10, and 15 on the basis of the driving unit operation information INF2 corresponding to the music data.

Figure 8:
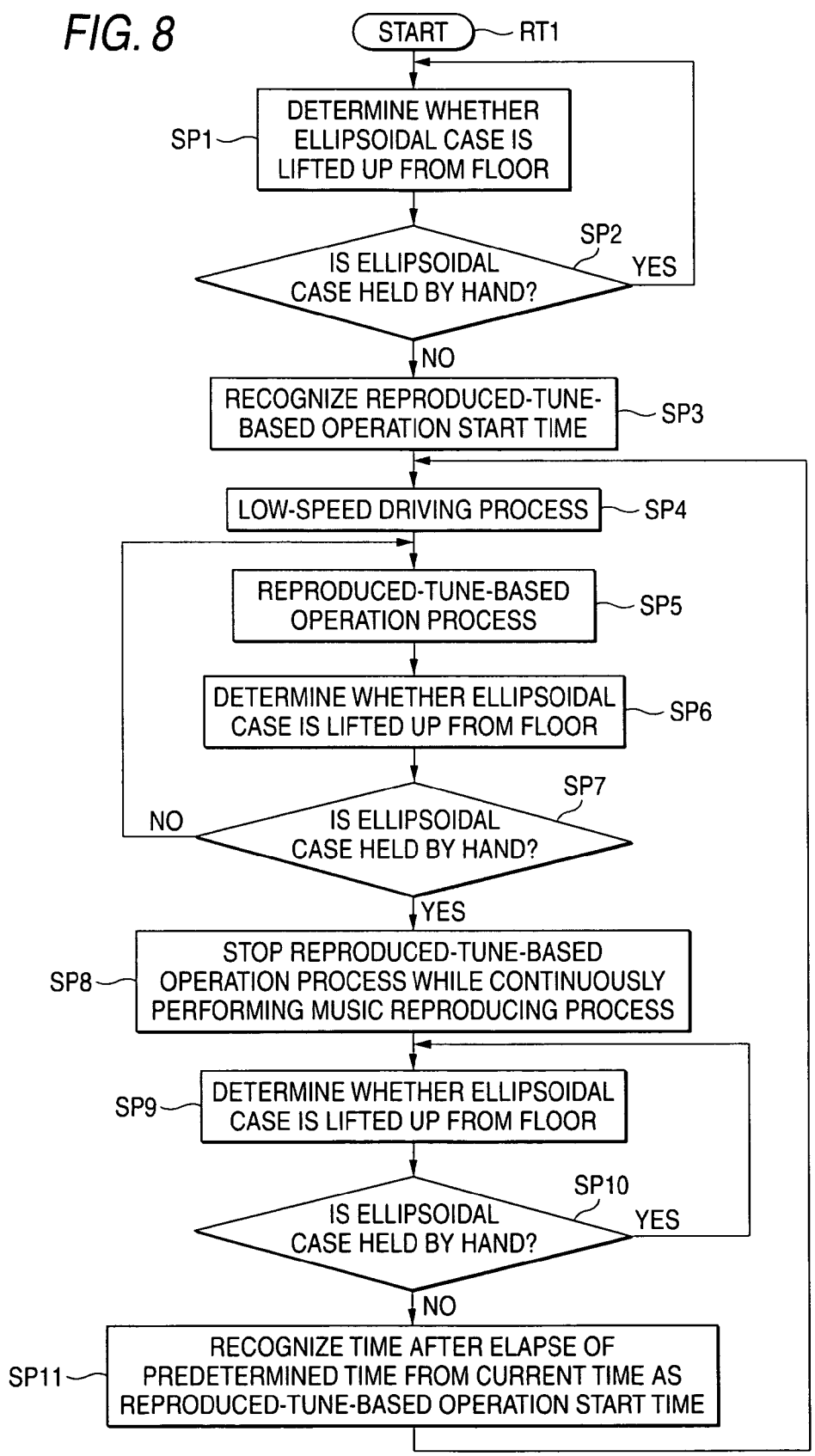
FIG. 8 is a flow chart illustrating a process of controlling a reproduced-tune-based operation.

Next, a reproduced-tune-based operation control process RT1 for controlling the stop or start of the reproduced-tune-based operation process will be described below with reference to a flow chart shown in FIG. 8.

For example, when a reproduction control instruction for instructing the reproduction of music is input, the control unit 20 of the music reproducing robot 1 performs step SP1 to determine whether the ellipsoidal case 2 is lifted up from the floor.

Then, as the result of the determination, when the control unit 20 determines in step SP2 that both the left wheel 3 and the right wheel 4 of the ellipsoidal case 2 come into contact with the floor, the process proceeds to step SP3.

In step SP3, the control unit 20 recognizes a time t1 on the reproduction axis time AX1 when the music reproducing process starts in response to the input reproduction control instruction as a reproduced-tune-based operation start time t1 when the reproduced-tune-based operation process starts. Then, the control unit 20 performs step SP4 to execute a low-speed driving process.

In the low-speed driving process, the control unit 20 compares the opening/closing angles of the left opening/closing member 12 and the right opening/closing member 17 represented in the driving unit operation information INF2 at the reproduced-tune-based operation start time t1 with the opening/closing angles of the left opening/closing member 12 and the right opening/closing member 17 at the current positions thereof, on the basis of the driving unit operation information INF2. As the result of the comparison, when the difference between the opening/closing angles of the left opening/closing member 12 and the right opening/closing member 17 represented in the driving unit operation information INF2 and the opening/closing angles thereof at the current positions is smaller than a predetermined value, the control unit 20 determines that an excessively large load is not applied around the left opening/closing member 12 and the right opening/closing member 17 even when the left and right opening/closing members 12 and 17 are suddenly opened/closed from the current positions up to the opening/closing angles represented in the driving unit operation information INF2. In addition, in the low-speed driving process, the control unit 20 compares the rotational angles of the left rotator 10 and the right rotator 15 represented in the driving unit operation information INF2 at the reproduced-tune-based operation start time t1 with the rotational angles of the left rotator 10 and the right rotator 15 at the current positions thereof, on the basis of the driving unit operation information INF2. As the result of the comparison, when the difference between the rotational angles of the left rotator 10 and the right rotator 15 represented in the driving unit operation information INF2 and the rotational angles thereof at the current positions is smaller than a predetermined value, the control unit 20 determines that an excessively large load is not applied around the left rotator 10 and the right rotator 15 even when the left and right rotators 10 and 15 are suddenly rotated. In this case, the control unit 20 performs step SP5.

In step SP5, the control unit 20 starts to perform the reproduced-tune-based operation process at the recognized reproduced-tune-based operation start time t1. In this way, the music reproducing robot 1 can perform the reproduced-tune-based operation process of operating the driving units 3, 4, 12, 17, 10, and 15 in synchronization with the tune of the music being reproduced.

Then, the control unit 20 performs step SP6 to determine whether the ellipsoidal case 2 is lifted up from the floor again. As the result of the determination, when it is determined in step SP7 that both the left wheel 3 and the right wheel 4 of the ellipsoidal case 2 come into contact with the floor, the control unit 20 returns to step SP5 with the negative result to continuously perform the reproduced-tune-based operation process. On the other hand, when it is determined in step SP7 that the ellipsoidal case 2 is lifted up from the floor, the control unit 20 performs step SP8 with the affirmative result.

In step SP8, the control unit 20 stops the reproduced-tune-based operation process while continuously performing the music reproducing process. Then, the operation of the driving units 3, 4, 12, 17, 10, and 15 provided in the ellipsoidal case 2 stops, which makes it possible to avoid a condition in which a user drops the ellipsoidal case 2 held by his or her hand.

Then, the control unit 20 performs step SP9 to determine whether the ellipsoidal case 2 is lifted up from the floor again. As the result of the determination, when it is determined in step SP10 that the ellipsoidal case 2 is lifted up from the floor, the control unit 20 returns to step SP9 with the affirmative result to continuously perform the music reproducing process while the reproduced-tune-based operation process stops. On the other hand, as the result of the determination, when it is determined in step SP10 that both the left wheel 3 and the right wheel 4 of the ellipsoidal case 2 come into contact with the floor, the control unit 20 performs step SP11 with the negative result.

In step SP11, the control unit 20 recognizes a time t3 after an elapse of a predetermined time (for example, 10 seconds) from the current time t2 on the reproduction time axis AX1 as a reproduced-tune-based operation start time t3 for restarting the reproduced-tune-based operation process, and returns to step SP4 to perform the low-speed driving process.

In the low-speed driving process, the control unit 20 compares the opening/closing angles of the left opening/closing member 12 and the right opening/closing member 17 represented in the driving unit operation information INF2 at the reproduced-tune-based operation start time t3 with the opening/closing angles of the left opening/closing member 12 and the right opening/closing member 17 at the current positions thereof, on the basis of the driving unit operation information INF2. As the result of the comparison, when the difference between the opening/closing angles of the left opening/closing member 12 and the right opening/closing member 17 represented in the driving unit operation information INF2 and the opening/closing angles thereof at the current positions is a predetermined angular difference threshold value or more, the control unit 20 determines that an excessively large load is applied around the left opening/closing member 12 and the right opening/closing member 17 when the left and right opening/closing members 12 and 17 are suddenly opened/closed from the current positions up to the opening/closing angles represented in the driving unit operation information INF2. Therefore, the control unit 20 opens/closes the left opening/closing member 12 and the right opening/closing member 17 at low speed at angles close to the opening/closing angles represented in the driving unit operation information INF2. In addition, in the low-speed driving process, the control unit 20 compares the rotational angles of the left rotator 10 and the right rotator 15 represented in the driving unit operation information INF2 at the reproduced-tune-based operation start time t3 with the rotational angles of the left rotator 10 and the right rotator 15 at the current positions thereof, on the basis of the driving unit operation information INF2. As the result of the comparison, when the difference between the rotational angles of the left rotator 10 and the right rotator 15 represented in the driving unit operation information INF2 and the rotational angles thereof at the current positions is a predetermined threshold value or more, the control unit 20 determines that an excessively large load is applied around the left rotator 10 and the right rotator 15 when the left and right rotators 10 and 15 are suddenly rotated. Therefore, the control unit 20 rotates the left rotator 10 and the right rotator 15 at low speed at angles close to the rotational angles represented in the driving unit operation information INF2. Thus, the music reproducing robot 1 can restart the reproduced-tune-based operation process without applying an excessively large load around the driving units 12, 17, 10, and 15.

After performing the low-speed driving process, the control unit 20 performs step SP5 to restart the reproduced-tune-based operation process at the reproduced-tune-based operation start time t3.

According to the music reproducing robot 1, when both the left wheel 3 and the right wheel 4 of the ellipsoidal case 2 is repositioned so as to come into contact with the floor, it is possible to restart the operation of the driving units 3, 4, 12, 17, 10, and 15 in synchronization with the tune of the music being reproduced.

(3) Reproduction Mode Changing Process

The music reproducing robot 1 has two types of reproduction modes, that is, a normal reproduction mode in which music data stored in the storage unit 26 is sequentially reproduced and a recommend mode in which one of the music data stored in the storage unit 26 that is recommended by the music reproducing robot 1 is reproduced.

For example, as a method of selecting a recommended music file in the recommend mode, the music reproducing robot 1 may reproduce one of the music data by learning user's musical preference (for example, genre and tempo) from the music data and by selecting one of the music data that is close to the musical preference as a recommended music item.

The music reproducing robot 1 is set in the normal reproduction mode in the initial state (at the time of shipment). When it is determined that the ellipsoidal case is oscillated by the user in a direction in which the reproduction mode is changed in a process of determining the oscillation direction (this oscillating operation is referred to as a mode changing operation), the control unit 20 of the music reproducing robot 1 changes the reproduction mode from the normal reproduction mode to the recommend mode. In addition, when the control unit 20 recognizes in the recommend mode that a user performs a mode changing operation, it changes the reproduction mode from the recommend mode to the normal reproduction mode. In this way, the user can change the reproduction mode at his or her option by operating the music reproducing robot 1 in the direction in which the ellipsoidal case is oscillated.

In addition to the above-mentioned structure, when predetermined conditions to change the recommend mode are satisfied, the music reproducing robot 1 can automatically change the reproduction mode. The predetermined conditions to change the recommend mode include: 1) a recommend mode time zone; 2) a continuous skip operation; and 3) an album ending operation. The user can selectively turn on (the reproduction mode is automatically changed) or off (the reproduction mode is not automatically changed) the function of automatically changing the reproduction mode of the music reproducing robot 1 by oscillating the ellipsoidal case.

The recommend mode time zone 1) means a time zone predetermined by the user in which the reproduction mode is automatically changed to the recommend mode. For example, it is considered that a specific time zone according to the life style of the user (a time zone from 10 to 12 p.m. in which the user rests) is set to a time zone to change. When the time to change has elapsed, the reproduction mode returns to the normal reproduction mode.

In this case, content suitable for the recommend mode time zone may be selected as one of the music data recommended by the music reproducing robot. That is, the content has information items, such as a genre, a tempo, and a mood, as additional data, and the music reproducing robot 1 selects the content suitable for the recommend mode time zone as recommended music, on the basis of the additional data, and reproduces the content. For example, when the recommend mode time zone is set in the night, content having a slow tempo may be selected, and when the recommend mode time zone is set in the morning, content corresponding to a rock genre may be selected.

When a skip operation 2) (an operation of stopping a music file being reproduced and reproducing the next music file) is continuously performed a predetermined number of times (for example, ten times) within a predetermined time (for example, a relatively short time of about 5 seconds) from the reproduction start time of a music file (track) in the normal reproduction mode, that is, when the user is dissatisfied with these music files (album) being reproduced, the "continuous skip operation" automatically changes the reproduction mode to the recommend mode.

The "album ending operation" 3) automatically changes the reproduction mode to the recommend mode after the final music file (the final track) listed in an album is reproduced, or after all the music files listed in the album are reproduced in a shuffle reproduction mode.

Figure 9:
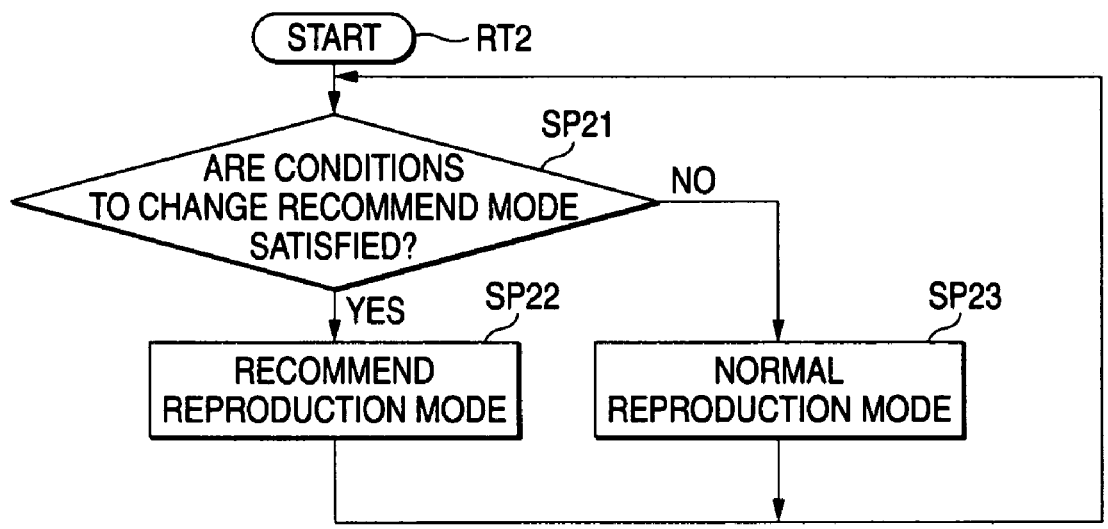
FIG. 9 is a flow chart illustrating a process of changing a reproduction mode.

Next, a reproduction mode changing process of automatically changing the reproduction mode will be described below with reference to a flow chart shown in FIG. 9.

When the automatic change function is turned on, the control unit 20 of the music reproducing robot 1 performs step SP21 from a starting step of a reproduction mode changing process RT2 to determine whether these conditions to change the recommend mode are satisfied.

When it is determined in step SP21 that these conditions are satisfied, that is, at least one of the recommend mode time zone, the continuous skip operation, and the album ending operation, is satisfied, the control unit 20 performs step SP22 to set the reproduction mode to the recommend mode, and returns to step SP21. On the other hand, when it is determined in step SP21 that these conditions are not satisfied, that is, none of the recommend mode time zone, the continuous skip operation, and the album ending operation, is satisfied, the control unit 20 performs step SP23 to set the reproduction mode to the normal reproduction mode, and returns to step SP21.

In this way, the user can change the reproduction mode of the music reproducing robot 1 based on the user's will, and the music reproducing robot 1 can also automatically change the reproduction mode according to the reproduction mode changing process.

(4) Change in Motion According to Reproduction Mode

In addition to the above-mentioned structure, the music reproducing robot 1 has different motions in the normal reproduction mode and the recommend mode on the basis of the reproduced-tune-based operation process, thereby notifying the user of the current reproduction mode through the motion corresponding to the reproduction mode.

More specifically, two types of motion changing methods are used: a first motion changing method of changing the driving unit operation information INF2 for operating the driving units 3, 4, 12, 17, 10, and 15 in the recommend mode to generate the difference between motions; and a second motion changing method of changing the gain when the driving units 3, 4, 12, 17, 10, and 15 are operated to generate the difference between motions. The music reproducing robot 1 performs motion control in the recommend mode by selecting one of the first and second motion changing methods or by using both the methods. The selection of the mode changing method may be performed by the user, or it may be automatically performed by the music reproducing robot 1 according to external environments.

In the motion control, a voltage V applied to a motor can be expressed as follows: V=gain×(a target angle−the current angle). The "target angle" corresponds to a value at the timing of the driving unit operation information INF2.

Figure 10:
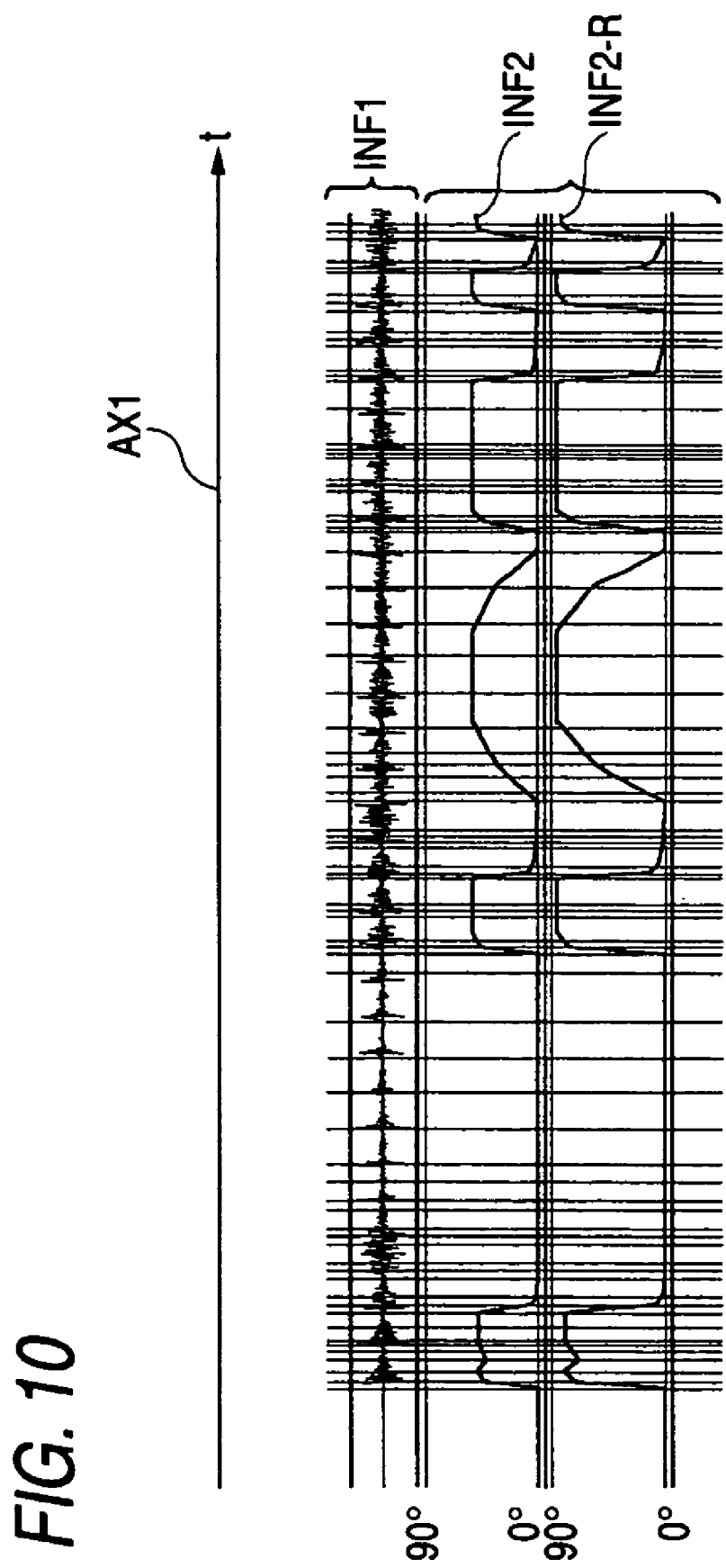
FIG. 10 is a diagram schematically illustrating driving unit operation information.

First, the first motion changing method will be described below. As shown in FIG. 10, in the recommend mode, the control unit 20 of the music reproducing robot 1 increases the amplitude of the driving unit operation information INF2 created for the normal reproduction mode (that is, increases the target angle) to create a driving unit operation information INF2-R for a recommend mode, and operates the driving units 3, 4, 12, 17, 10, and 15 on the basis of the information INF2-R. Then, the amplitude or speed of each of the driving units 3, 4, 12, 17, 10, and 15 of the music reproducing robot 1 increases, as compared with the normal reproduction mode, which causes the music reproducing robot 1 to move quickly.

In the second motion changing method, the control unit 20 of the music reproducing robot 1 uses the driving unit operation information INF2 as in the normal reproduction mode, but increases the gain as compared with the normal reproduction mode. In this case, the amplitude of the driving unit operation information INF2 is equal to that in the normal reproduction mode, but the operational speed of the driving unit increases, as compared with the normal reproduction mode, which makes it possible for the music reproducing robot 1 to move quickly.

In the recommend mode, the music reproducing robot 1 moves more quickly, as compared with the normal reproduction mode, so that the user can have the impression that the music reproducing robot 1 moves as if it operates with a strong will.

Figure 11:
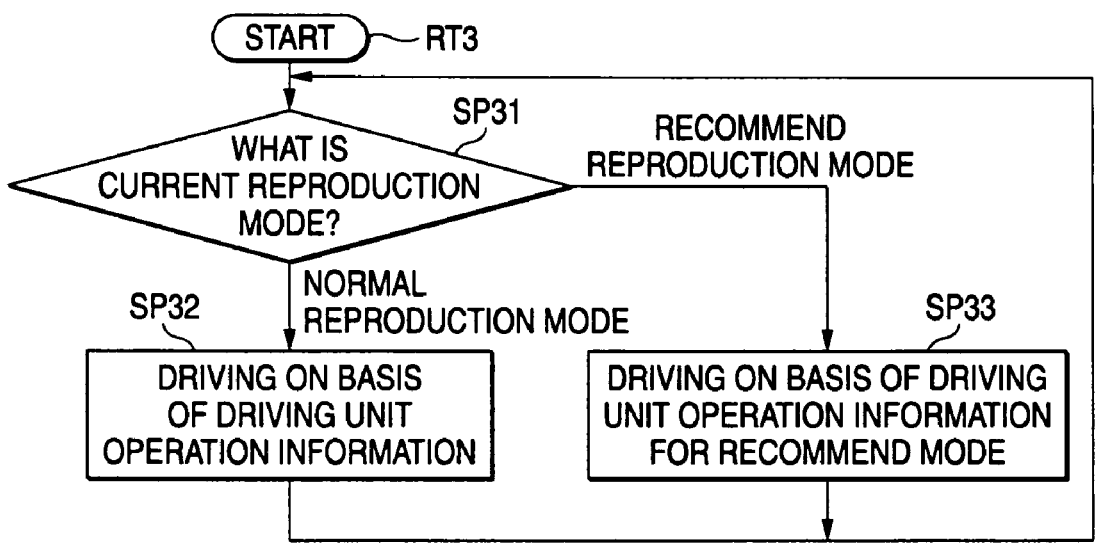
FIG. 11 is a flow chart illustrating a motion control process.

Next, a motion control process of changing motion according to the reproduction mode will be described below with reference to a flow chart shown in FIG. 11.

The control unit 20 of the music reproducing robot 1 performs step SP31 from a starting step of a motion control process RT3 to check the current reproduction mode. When it is determined in step SP31 that the current reproduction mode is the normal reproduction mode, the control unit 20 performs step SP32 to perform motion on the basis of the driving unit operation information INF2, and returns to step SP31.

On the other hand, when it is determined in step SP31 that the current reproduction mode is the recommend mode, the control unit 20 performs step SP33 to create the driving unit operation information INF2-R for a recommend mode, and performs motion on the basis of the information INF2-R. Then, the control unit 20 returns to step SP31.

(5) Operation and Effect

In the above-mentioned structure, the music reproducing robot 1 automatically changes the reproduction mode to the recommend mode when a function of automatically changing the reproduction mode is turned on and any one of the recommend mode change conditions, that is, the "recommend mode time zone", the "continuous skip operation", and the "album ending operation" is satisfied.

Therefore, the reproduction mode of the music reproducing robot 1 can be automatically changed without the manual operation by the user and the music reproducing robot 1 operates as if it has its own will to change the mode, which results in an improvement in entertainment features.

In this case, when the "continuous skip operation" in which the user continuously skips music files, the reproduction mode of the music reproducing robot 1 is automatically changed to the recommend mode, so that the user can have the impression that as if the music reproducing robot 1 understands that the user is dissatisfied with a group of music files and thus reproduces recommended music files for the user. As a result, it is possible to improve entertainment features.

In the recommend mode, the music reproducing robot 1 operates the driving units on the basis of the driving unit operation information INF2-R for a recommend mode that has an amplitude larger than that of the driving unit operation information INF2 for a normal reproduction mode, or increases the gain to operate the driving units, so that it can move more quickly in the recommend mode than in the normal reproduction mode. In this way, the music reproducing robot 1 can notify the reproduction mode of the user through the motion thereof.

Further, the music reproducing robot 1 can give the user the impression that it operates with a strong will or it heartily recommends music to the user through its quick motion. As a result, it is possible to improve entertainment features.

According to the above-mentioned structure, the music reproducing robot 1 moves more quickly in the recommend mode than in the normal reproduction mode, which makes it possible to intuitively notify the user of the reproduction mode of the music reproducing robot 1 through the motion of the music reproducing robot 1, without using a display unit, such as a liquid crystal display device. As a result, it is possible to realize the music reproducing robot 1 having improved entertainment features, as compared with the related art.

(6) Other Embodiments

In the above-described embodiment, the control unit 20 performs the reproduced-tune-based operation control process RT1, the reproduction mode changing process RT2, or the motion control process RT3 in a software manner according to programs installed in the music reproducing robot 1, but the invention is not limited thereto. For example, the music reproducing robot 1 may be provided with circuits for performing these processes, and the circuits may perform these processes in a hardware manner. In addition, the programs for performing these processes may be stored in a storage medium, such as a compact disk (CD).

Therefore, the invention can be applied to, for example, a music reproducing apparatus for reproducing music on the basis of music data.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing apparatus comprising:
   a storage unit having a plurality of content data stored therein;
   a reproducing unit reading out the content data stored in the storage unit and reproducing the read content;
   a driving unit driving a predetermined driven unit according to the content of the content data reproduced by the reproducing unit; and
   a control unit controlling the reproducing unit in a normal reproduction mode in which the content data stored in the storage unit are reproduced in a predetermined order and a recommend mode in which some of the content data stored in the storage unit are selected as recommended music files and the selected content data are reproduced, and controlling the driving unit in the recommend mode to drive the driven unit more quickly than in the normal reproduction mode.

2. The reproducing apparatus according to claim 1,
   wherein, in the normal reproduction mode, the control unit controls the driving unit on the basis of a driving unit operation information corresponding to the content of the content data reproduced by the reproducing unit, and
   in the recommend mode, the control unit controls the driving unit by increasing the amplitude of the driving unit operation information to operate the driven unit.

3. A reproducing method of a reproduction apparatus, comprising the steps of:
   reading out content data stored in a storage unit and reproducing the read content data; and
   driving a predetermined driven unit according to the content of the content data reproduced in the reproducing step,
   wherein the reproducing step includes two reproduction modes, that is, a normal reproduction mode in which the content data stored in the storage unit are reproduced in a predetermined order and a recommend mode in which some of the content data stored in the storage unit are selected as recommended music files and the selected content data are reproduced, and
   when the reproducing step is performed in the recommend mode, the driven unit is driven more quickly than in the normal reproduction mode in the driving step.

4. A reproducing program that allows a reproducing apparatus to perform the steps of:
   reading out content data stored in a storage unit and reproducing the read content data; and
   driving a predetermined driven unit according to the content of the content data reproduced in the reproducing step,
   wherein the reproducing step includes two reproduction modes, that is, a normal reproduction mode in which the content data stored in the storage unit are reproduced in a predetermined order and a recommend mode in which some of the content data stored in the storage unit are selected as recommended music files and the selected content data are reproduced, and
   when the reproducing step is performed in the recommend mode, the driven unit is driven more quickly than in the normal reproduction mode in the driving step.

* * * * *